Oct. 4, 1927.

D. KLAUS 1,644,477

BOLT

Filed June 8, 1926

INVENTOR
D. Klaus
BY
ATTORNEY

Patented Oct. 4, 1927.

1,644,477

UNITED STATES PATENT OFFICE.

DANIEL KLAUS, OF GOLDEN VALLEY, NORTH DAKOTA.

BOLT.

Application filed June 8, 1926. Serial No. 114,386.

The main object of this invention is to provide a double ended screw which is adapted for use when joining two longitudinal members side by side with either a space between or in contact with each other. An article of this type would have various uses in joinery, especially in forming laminated sections of woodwork.

The above and other objects will become apparent in the description below, in which characters of reference refer to like-named parts in the drawing.

Referring briefly to the drawing, Figure 1 is a longitudinal sectional elevational view of the interlocking screw.

Figure 1:
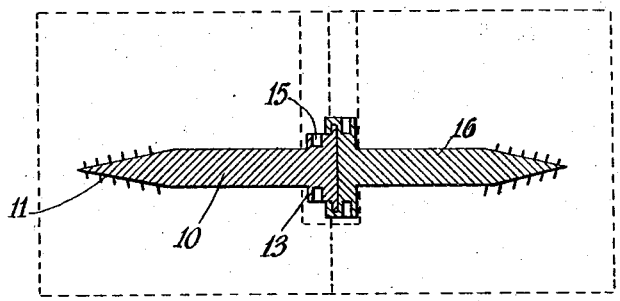
Figure 2:
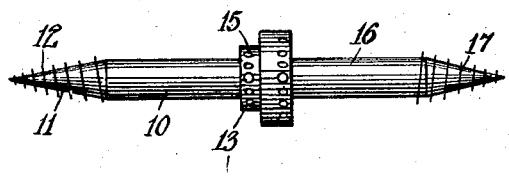
Figure 2 is an external longitudinal elevational view of said screw.
Figure 3:
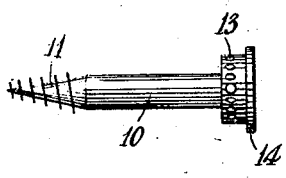
Figures 3 and 4 are longitudinal elevational views of the component parts of the interlocked screw.
Figure 4:
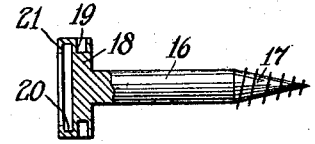

Referring in detail to the drawing, the numeral 10 indicates the stud of one of the screw members. This stud has a pointed end 11 on which threads 12 are formed. The stud at one end opposite to the point 11 has a cylindrical head 13 which is surmounted by an encircling flange 14, rectangular in cross section. The head 13 of the screw is provided with a plurality of spanner holes 15 into which one end of a spanner pin may be inserted for rotation of the stud 10. The opposite member of the interlocking screw comprises a similar stud 16 having a threaded and pointed end 17 at one end and a head 18 relatively larger than the head 13 of the opposing stud and on the periphery of said head 18, a plurality of similar spanner holes 19 are formed. Within the head 18, a circular channel 20 is formed in which the flange 14 of the opposing member is adapted to be inserted and rotated. A lip 21 partly closes said channel after the flange 14 of the opposing member has been inserted into it and is bent downwardly to overlap part of the face of the flange, as indicated in Figure 1.

In order to secure two studs, beams, or boards, to each other, so that the surface of one lies in contact with the adjacent surface of the other, stud 10 of one of the members of the screw is inserted into a small hole in one of the studs and the opposite stud 16 of the screw is fixed similarly in the opposing board member. These screw members are individually and independently rotatable in either direction. In order to rotate these members, it is necessary that the boards which are to be secured together be provided with recesses for the insertion of the spanner pins. By inserting a pin in the spanner holes 15, the screw stud 10 is rotated, and in order to rotate the opposite stud 16 in either direction, the pin is inserted into the spanner holes 19 located in the head 18 of the opposing member. By continued rotation of both of these members, one rotating independently of the other, a pair of boards may be adjusted into contacting position with each other with the screws in concealed position. These screw members may be removed from place in the same manner as they are inserted.

It is to be noted that certain changes in form and construction may be made without departing from the spirit and scope of the invention.

I claim:—

In a screw, a pair of opposing studs having oppositely disposed pointed and threaded ends, heads on said studs, means for permanently interlocking said heads for permitting independent rotation of either of said studs in either direction comprising an encircling flange rectangular in cross section on one of said heads, means on the opposite head engaging said flange for rotatably interlocking both heads comprising a lip on one head overlapping the face of the flange around the entire periphery of the opposite head, said lip forming a channel in its respective head, the channel rotatably receiving the flange of the opposite head and spanner holes formed on the heads of said studs.

In testimony whereof I affix my signature.

DANIEL KLAUS.